US007583658B1

(12) United States Patent
Wang et al.

(10) Patent No.: US 7,583,658 B1
(45) Date of Patent: Sep. 1, 2009

(54) SIGNAL PROCESSING ALLOCATION USING CREDIT PREDICTION

(75) Inventors: Jianxin Wang, San Jose, CA (US); Prasad Miriyala, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 994 days.

(21) Appl. No.: 10/871,581

(22) Filed: Jun. 17, 2004

(51) Int. Cl.
*H04L 12/66* (2006.01)
*H04L 12/56* (2006.01)
*H04J 3/16* (2006.01)

(52) U.S. Cl. ....................... 370/352; 370/392; 370/466; 718/105

(58) Field of Classification Search ....................... None
See application file for complete search history.

(56) References Cited

U.S. PATENT DOCUMENTS 5,208,804 A 5/1993 Wilson et al.
5,497,373 A * 3/1996 Hulen et al. ................ 370/259
6,009,507 A 12/1999 Brooks et al.
6,266,342 B1 7/2001 Stacey et al.
6,370,386 B1 4/2002 Williams
6,418,147 B1 * 7/2002 Wiedeman .................. 370/468
6,445,697 B1 * 9/2002 Fenton ....................... 370/357
6,466,559 B1 10/2002 Johansson et al.
6,542,600 B1 4/2003 Munson et al.
6,584,108 B1 6/2003 Chung et al.
6,714,630 B1 3/2004 Baum
6,763,017 B1 * 7/2004 Buckingham et al. ....... 370/352
6,898,208 B1 * 5/2005 Sligo et al. .................. 370/466
6,970,709 B1 11/2005 Williams
2003/0067818 A1 * 4/2003 DeMars ...................... 370/392
2003/0067918 A1 * 4/2003 DeMars ...................... 370/392
2003/0084144 A1 5/2003 Lipinsky
2003/0179767 A1 9/2003 Kloth et al.
2004/0002339 A1 * 1/2004 O'Connor ................... 455/450
2005/0201303 A1 * 9/2005 Oliveira et al. ............. 370/260

FOREIGN PATENT DOCUMENTS

EP 1 017 244 A1 7/2000

OTHER PUBLICATIONS

"Understanding High Density Voice Network Modules", Aug. 13, 2002.
"Release Notes for the Cisco ICS 7750 for System Software Release 1.0.x", Apr. 30, 2001.

(Continued)

*Primary Examiner*—Steven Nguyen
(74) *Attorney, Agent, or Firm*—Schwegman, Lundberg & Woessner, P.A.

(57) ABSTRACT

Digital signal processing resource allocation using a credit prediction scheme is described. The digital signal processing allocation method may include predicting a digital signal processor (DSP) codec that could be requested by a channel at a channel setup stage when a requested codec is unknown; and selecting a DSP having the codec from among a plurality of DSPs to open the channel based on the predicting.

24 Claims, 9 Drawing Sheets

500

| Codec type | Max # of channels per DSP | Credits required per channel |
|---|---|---|
| G.711ulaw or Alaw | 16 | 6 |
| G729a(b) | 8 | 12 |
| G.723.1 | 6 | 16 |
| G.728 | 6 | 16 |
| GSM-FR | 8 | 12 |
| GSM-EFR | 6 | 16 |
| Fax-Relay | 8 | 12 |
| Modem-Relay | 6 | 16 |

OTHER PUBLICATIONS

International Telecommunication Union (ITU). ITU-T, G.711 General Aspects of Digital Transmission Systems: Terminal Equipments, Pulse Code Modulation (PCM) of Voice Freqeuncies (1993).

International Telecommunication Union (ITU). ITU-T, G.729. General Aspects of Digital Transmission Systems. Coding of Speech at 8kbit/s Using Conjugate-Structure Algebraic-Code-Excited Linear-Prediction (CS-ACELP) (Mar. 1996).

International Telecommunication Union (ITU). ITU-T, G.729, Annex A. Series G: Transmission Systems and Media; General Aspects of Digital Transmission Systems. Coding of Speech at 8kbit/s Using Conjugate-Structure Algebraic-Code-Excited Linear-Prediction (CS-ACELP). Annex A: Reduced complexity 8 kbit/s CS-ACELP speech codec (Nov. 1996).

* cited by examiner

| Codec Type | Max # Channels per DSP* | MIPS required per channel |
|---|---|---|
| G.711ulaw or Alaw | 8 | 12 |
| G.729a | 4 | 25 |
| G.726 | 4 | 25 |
| G.723.1 | 3 | 33 |
| G.728 | 3 | 33 |
| Fax Relay | 4 | 25 |

*Assuming 100 MIPS available per DSP.

FIG. 2

500

| Codec type | Max # of channels per DSP | Credits required per channel |
|---|---|---|
| G.711ulaw or Alaw | 16 | 6 |
| G729a(b) | 8 | 12 |
| G.723.1 | 6 | 16 |
| G.728 | 6 | 16 |
| GSM-FR | 8 | 12 |
| GSM-EFR | 6 | 16 |
| Fax-Relay | 8 | 12 |
| Modem-Relay | 6 | 16 |

FIG. 5

SIGNAL PROCESSING ALLOCATION USING CREDIT PREDICTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the present invention pertain to the field of digital signal processing and, more particularly, to the allocation of digital signal processing resources.

BACKGROUND

The Internet may be described in a simplified manner as a collection of computer systems that are interconnected by public/private networks (e.g., using transmission lines and gateway servers) to enable the transfer of information among them. Theses networks include the public switched telephone networks (PSTN) that transport voice over dedicated connections and data networks that employ switches and/or routers to transport data (e.g., text, voice, video, etc.).

Telephone and data network infrastructures are usually deployed together with limited sharing of resources, especially with regards to the network gateway, or access, servers (e.g., switches and routers) that direct the data payloads throughout the networks. Furthermore, the network access servers (NAS) that are used to provide a data path, or interface, between multiple networks that each may operate according to a different networking standard protocol. Examples of the networking protocols supported by these gateway servers include, for example, Internet Protocol (IP), frame relay, T1 channelized, E1 channelized, and Asynchronous Transfer Mode (ATM). The cost of this redundancy coupled with advances in data network technology has led, where possible, to integrated network traffic comprising voice, video, data, facsimile, and modem information over a unified data network that is interfaced by multiservice NAS.

FIG. 1 illustrates a conventional NAS in which an array of digital signal processors (DSP) is typically required to perform digital signal processing operations on a number of channels of data. For modem and facsimile traffic, the DSPs are mostly used to modulate and demodulate the traffic to and from the dial-up telephone access links. For a voice call over the same link, the same DSP can instead be used to compress and decompress the voice traffic towards and from the core of the data network, to suppress undesirable echoes which usually arise at various points in the network, to suppress unnecessary silent packets to preserve network bandwidth, and to detect end-to-end voice activity to save data network bandwidth. A host bus and host processor typically communicates payload data between the DSP array and the data network side of the DSP array. While the host bus may include a number of channels of information, the typical system permanently assigns each channel to a particular DSP of the array.

As mentioned, one or more of the DSPs in the array may be used to compress and convert Time-Division-Multiplexing (TDM) streams from a PSTN into IP packets. The NAS receives the TDM signals, for example, through a T1 or E1 line, and converts them into IP packets. The packets are then transmitted through a network interface (e.g., Fast Ethernet) over an IP network. An Internetwork Operating System (IOS) runs on a central processing unit (CPU) of the NAS and can be used to track and control the operation of the DSP array. DSPs can also be used, for example, in Voice-over-Asynchronous Transfer Mode (VoATM), Voice-over Frame Relay (VoFrameRelay), and other similar applications.

Unfortunately, DSPs have limited computational power, measured in terms of a number of Million Instructions Per Second (MIPS). A DSP, therefore, can only process a limited number of channels. The number of channels that the DSP can process depends primarily on the complexity of a compression coding and decoding (codec) type used for the channels. The different channels can either have the same codec type or different codec types. For example, a typical model C549 DSP, manufactured by Texas Instruments (TI), has 100 total available MIPS and can, for example, process eight channels of G.711 calls, or two channels of G.711 calls plus three channels of G.729a calls. FIG. 2 illustrates a table identifying various codec types and their associated processing bandwidth requirements.

A typical VoIP call on a DSP is set up in two steps. These steps are primarily dominated by the VoIP protocol and are therefore not implementation specific. In a first step, the voice channel is opened on a DSP with the minimum allowable MIPS consumption (e.g., 12 MIPS) preallocated. At this time, the DSP does not have any information on what codec type will be used once the channel is established. The codec type is determined through negotiation between the voice entities. The codec information is typically carried by an H.323 capabilities exchange or in a Media Gateway Control Protocol (MGCP) ModifyConnection (MDCX) package. In a second step, the codec type is set on the DSP and more MIPS are acquired, if needed. Additional MIPS may be required, for example, if a higher complexity codec type is selected. For example, if a G.729a codec type is to be used, an additional thirteen MIPS (25 required MIPS−12 preallocated MIPS=13) are required by the voice channel.

The first step of the call setup can occur at the same time for multiple VoIP calls, before any of those calls reach the second step. Accordingly, unless an effective method of managing DSP resources (e.g., available MIPS) is provided, the DSPs may have unbalanced load, resulting in inefficient DSP utilization.

Existing methods for managing DSP resource include a "channel-oriented" approach and a "complexity-oriented" approach. In the conventional "complexity-oriented" resource management approach, DSP resources are managed based on an allocation of MIPS. Using this approach, the DSP with the most available MIPS is chosen to open a call channel. The call is prematurely disconnected, however, if it later requires more MIPS than are available. The primary drawback to this approach is that the "maximum MIPS" rule used to select the DSP during the first call setup step may not allocate voice channels to the most appropriate DSP. This can result in one or more, or all, of the channels later being prematurely disconnected. A substantial amount of the available bandwidth on a DSP may therefore not be utilized.

In the channel-oriented approach to DSP resource management, a fixed number of channels are established per DSP. For example, a DSP can be configured to process up to four voice channels, no matter which codec type is used. The drawback of this approach, however, is that a DSP using this scheme generally has fewer channels established than it is capable of handling. In the example above, for instance, the DSP is limited to processing a maximum of four channels of G.711 calls even though it can actually handle eight channels of this codec type. One method of managing DSPs in a channel-oriented approach is discussed in U.S. Pat. No. 6,584,108, illustrated in FIG. 3. In U.S. Pat. No. 6,584,108, a DSP resource manager maintains three types of pools: a free DSP device ready pool which contains whole (unfragmented) DSPs; an active DSP channel pool which contains DSP voice channels being used, and; a multiple free DSP channel ready pool, each containing several DSP channels with pre-loaded codecs. Practically, each pool is composed of one G.711 channel and multiple compression codec channels (e.g., G.729a, G729, G711, etc.). Per the discussed method, a DSP must be fragmented into channels. Each channel is pre-loaded with a certain codec type (composing a pool). When a call comes in, DSP resources are selected from one of the pools, with preference calculated by weight, fragmentation factor and number of channels in a pool. If the existing DSP channel ready pool cannot satisfy the codec requested from a new call, and if there is no unfragmented DSP (i.e., the free DSP device ready pool is empty), the certain channels in the DSP channel ready pool are reloaded. The method tries to maintain channels with the same codec on the same DSP and tries to maintain as many unfragmented DSPs as possible. Such a method may not maximize the use efficiency of the DSPs.

SUMMARY

Digital signal processing resource allocation using a credit prediction scheme is described. In one embodiment, a signal processing allocation method may include predicting a signal processor codec that could be requested by a channel at a channel setup stage when a requested codec is unknown, and selecting a DSP having the codec from among a plurality of signal processors to open the channel based on the predicting. In one particular embodiment, the signal processors may be digital signal processors in a network access server.

Additional features of embodiments of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which:

FIG. 2 illustrates a table identifying various codec types and their associated processing bandwidth requirements.

FIG. 5 illustrates an exemplary embodiment of a credit table.

DETAILED DESCRIPTION

In the following description, numerous specific details are set forth such as examples of specific components, devices, methods, etc., in order to provide a thorough understanding of the present invention. It will be apparent, however, to one skilled in the art that these specific details need not be employed to practice the present invention. In other instances, well-known components or methods have not been described in detail in order to avoid unnecessarily obscuring the present invention. It should also be noted that the "lines" discussed herein that connect components may be single bit lines, multiple bit lines, or buses. The term "coupled" as used herein means coupled directly to, or indirectly through one or more intervening components.

A method and apparatus for digital signal processing resource allocation using a credit prediction scheme is described. The scheme predicts the DSP codec that could be requested by a channel at the channel setup stage when the codec is unknown but a (e.g., voice) channel must be established on a DSP. The effect of the scheme is to avoid selecting a DSP with insufficient resources and increase a channel (call) success rate under heavy load (simultaneous call setup attempts that reach an upper limit).

Figure 1:
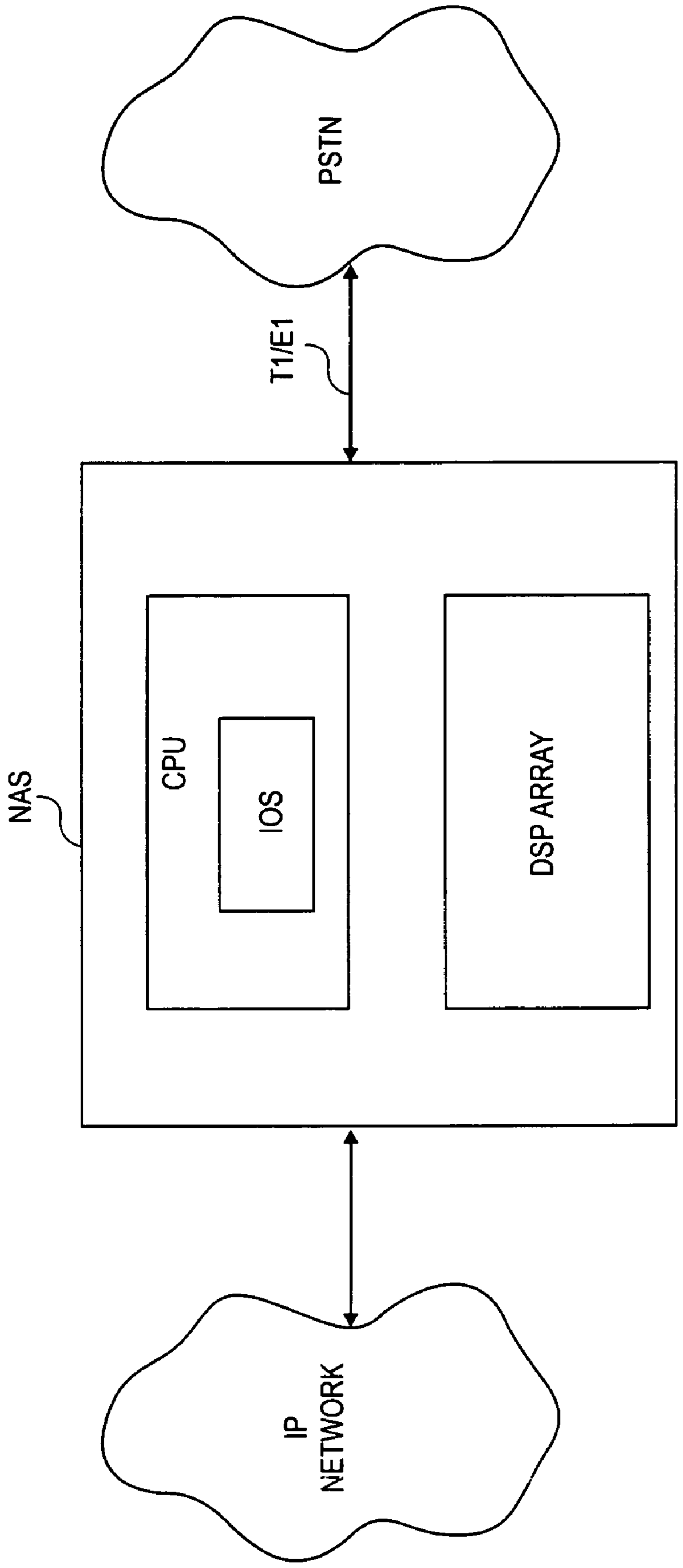
FIG. 1 illustrates a conventional NAS in having an array of digital signal processors.
Figure 3:
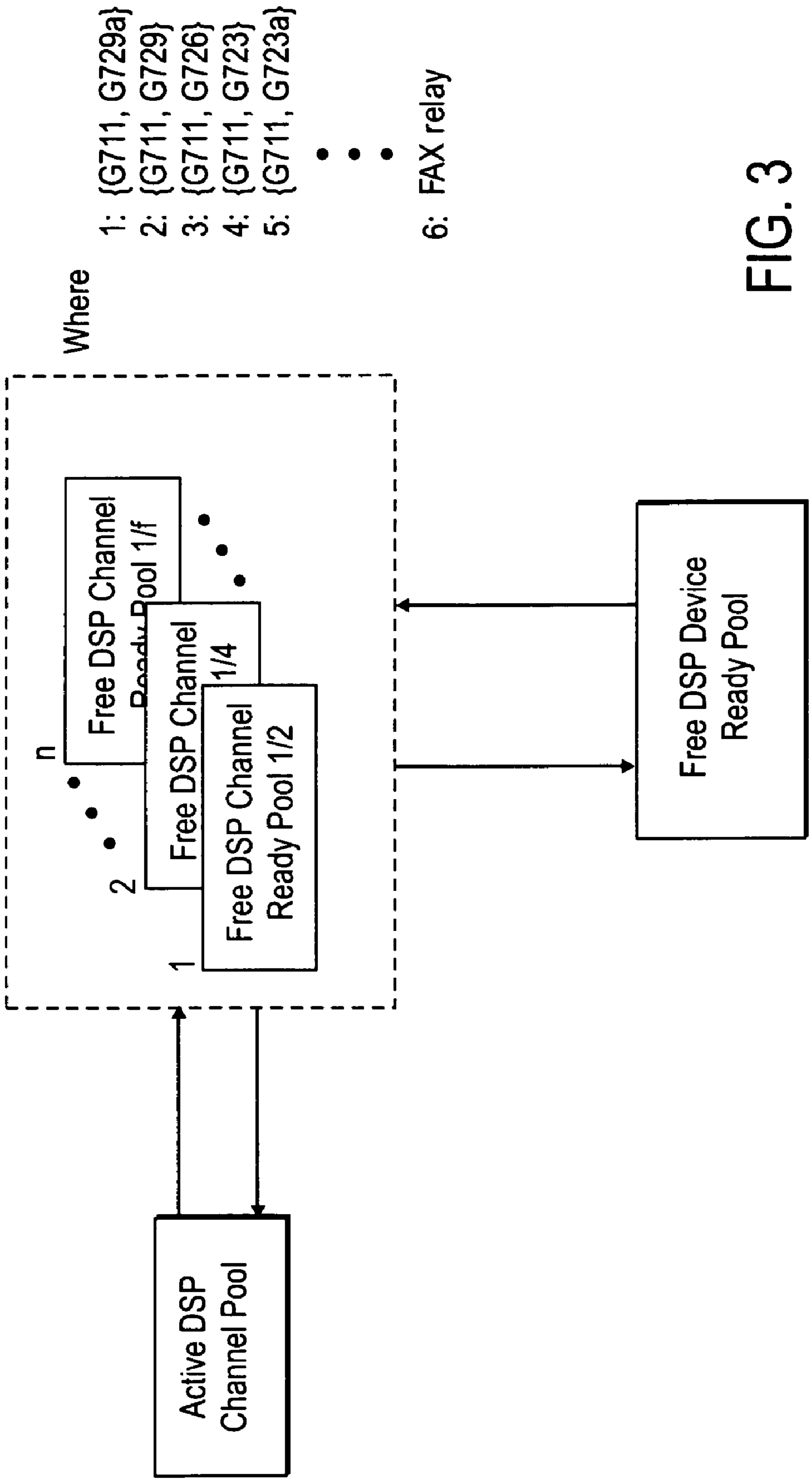
FIG. 3 illustrates a prior art method of managing DSPs using a channel-oriented approach.
Figure 4:
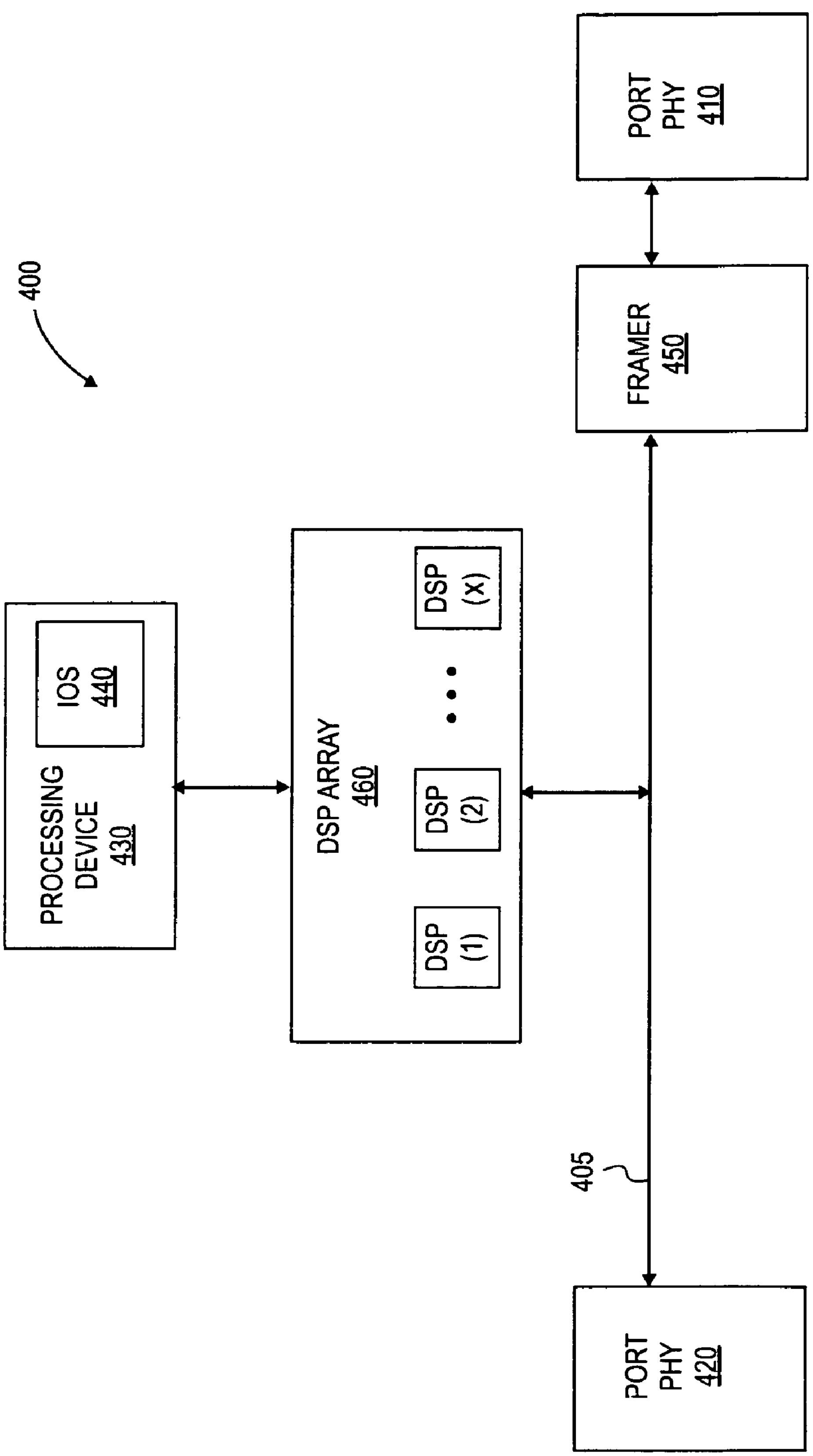
FIG. 4 illustrates one embodiment of a network access server.

FIG. 4 illustrates one embodiment of a network access server. NAS 400 may include physical (PHY) ports 410 and 420, framer 450, processing device 430, framer 450, DSP array 460, and bus 405. The components of the NAS may be coupled to each other using one or more buses and/or lines as exemplified by bus 405. NAS 400 may also include other components that have not been illustrated so as not to obscure an understanding of embodiments of the invention. NAS 400 is discussed below in relation to a gateway between TDM and IP networks only for ease of explanation and the invention is not so limited thereto. In alternative embodiments, NAS 400 integrates various types of networks, for example, public and private frame relay, ATM, synchronous transfer mode, bisynchronous transfer mode, etc. to integrate various types of data, for example, text, voice, video, facsimile, etc.

In one exemplary embodiment, NAS 400 may be used to interface a TDM network with an IP network. Data is received from and transmitted through physical ports 410 and 420. The NAS 400 receives the TDM signals through port 410, for example, on a T1 or E1 line, and uses framer 450 to format the data signals into the IP packet protocol structure for transmission through physical port 420 onto the IP network. Processing device 430 represents one or more processing devices (e.g., network processor, central processing unit, general processing unit, field programmable gate array, etc.) to process information and/or control the movement of data packets to and from framer 450. An Internetwork Operating System (IOS) 440 runs on a processing device 430 and can be used to track and control the operation of the DSP array 460. DSPs in the DSP array 460 may be used to compress and convert the TDM streams from a PSTN into IP packets.

Processing device 430 implements a credit prediction scheme that predicts the DSP codec that could be requested by a channel (e.g., for a voice call) at the channel setup stage when the codec is unknown but the (e.g., voice) channel must be established on one of DSP(1) to DSP(x) of DSP array 460.

DSP array 460 may support mixed codec types in a particular DSP, for example, as illustrated in FIG. 2. Upon initialization of NAS 400, DSP firmware sends the IOS 440 a list of supported codecs and the associated credits for each codec type. In one embodiment, credit may be calculated by combining MIPS, memory and other DSP resources that are required by a voice channel of the codec type. This is converted into a credit table and provided to processing device 430. The credit table can also be hard-coded into the IOS 440 code.

FIG. 5 illustrates an exemplary embodiment of a credit table. It should be noted that credit table 500 is only for illustration purposes in understanding the methods discussed herein. First, a maximum number of credits is assigned per DSP. The maximum number of credits can be any arbitrary number. In one embodiment, the maximum number of credits may be assigned based on the lowest common denominator for of the maximum number of channels for a DSP. For example, in the exemplary credit table of FIG. 5, the lowest common denominator for the 16, 8, and 6 maximum number of channels 96. As such, in the exemplary embodiment discussed herein, a maximum of 96 credits is assumed per DSP. The maximum number of credits may be less than 96 for a logical DSP, or part of a physical DSP that is reserved (e.g., for voice or transcoding). Alternatively, the maximum number of credits per DSP may be assigned by using other techniques and methodologies.

Credit table 500 provides the credits required per channel for some exemplary codecs based on the maximum number of channels for a codec type per DSP. The maximum number of channels for a particular codec type may be ascertained directly from a DSP as is known in the art. For example, as shown in the first row of credit table 500, if a DSP were to utilize only a G.711 codec to handle only G.711 calls, then that DSP could handle a maximum of 16 channels of G.711 ulaw calls.

In this exemplary embodiment, the number of credits required per channel is determined by the taking the 96 maximum number of credits allocated for a DSP and dividing this by the maximum number of channels that could by handled by a DSP with a particular codec type. For example, if a DSP where to utilize a C.711 codec, such a DSP could operate with only a maximum of 16 channels (as determined by the MIPS, memory, etc. of the DSP) and, correspondingly would have 6 (=96/16) credits per channel. Assuming that the G.711 codec is the largest codec of a DSP, then the minimum credits per channel would be set at 6 and the maximum credit per channel would be set at 16.

A channel, such as for voice call, may be set up by a two stage process. In the first stage, the voice channel is open on a DSP. At this moment, there is no information on what codec type is to be used. As such, a minimum number of credits (e.g., credits used by G.711 codec) are pre-allocated for the channel. In the second stage, the actual codec type to be used is determined. The codec type is determined by caps negotiation. The voice channel may acquire more credits if a codec other than C.711 is used. For example, for the G.729a codec, an additional 6 (=12−6) credits are required based on the credit table of FIG. 5. At this point, the voice channel may be deemed to be established. Under heavy load, the first stage of multiple calls may occur at the same time before any of the calls reaches the second stage. A credit prediction scheme as discussed below in relation to FIGS. 6A and 6B may be used to predict the DSP codecs that could be requested by the multiple channels at a channel setup stage when the codecs are unknown but a channel (e.g., for a voice call) must be established on a DSP. The effect of the scheme is to avoid selecting DSPs with insufficient resources and to increase the channel success rate under heavy load.

Figure 6A:
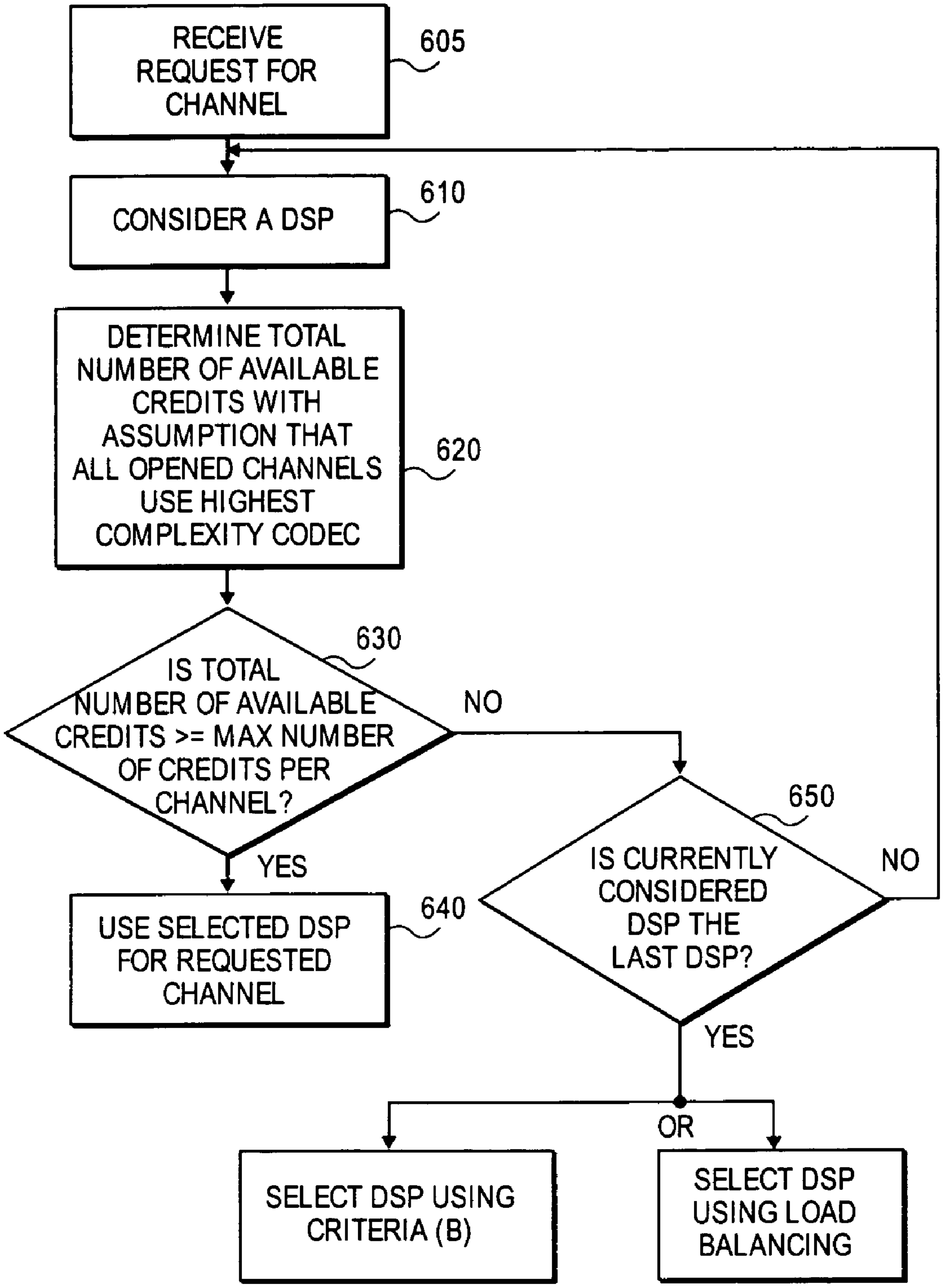
FIGS. 6A and 6B illustrate embodiments of a predictive non-load balancing method of digital signal processing resource allocation.
Figure 6B:
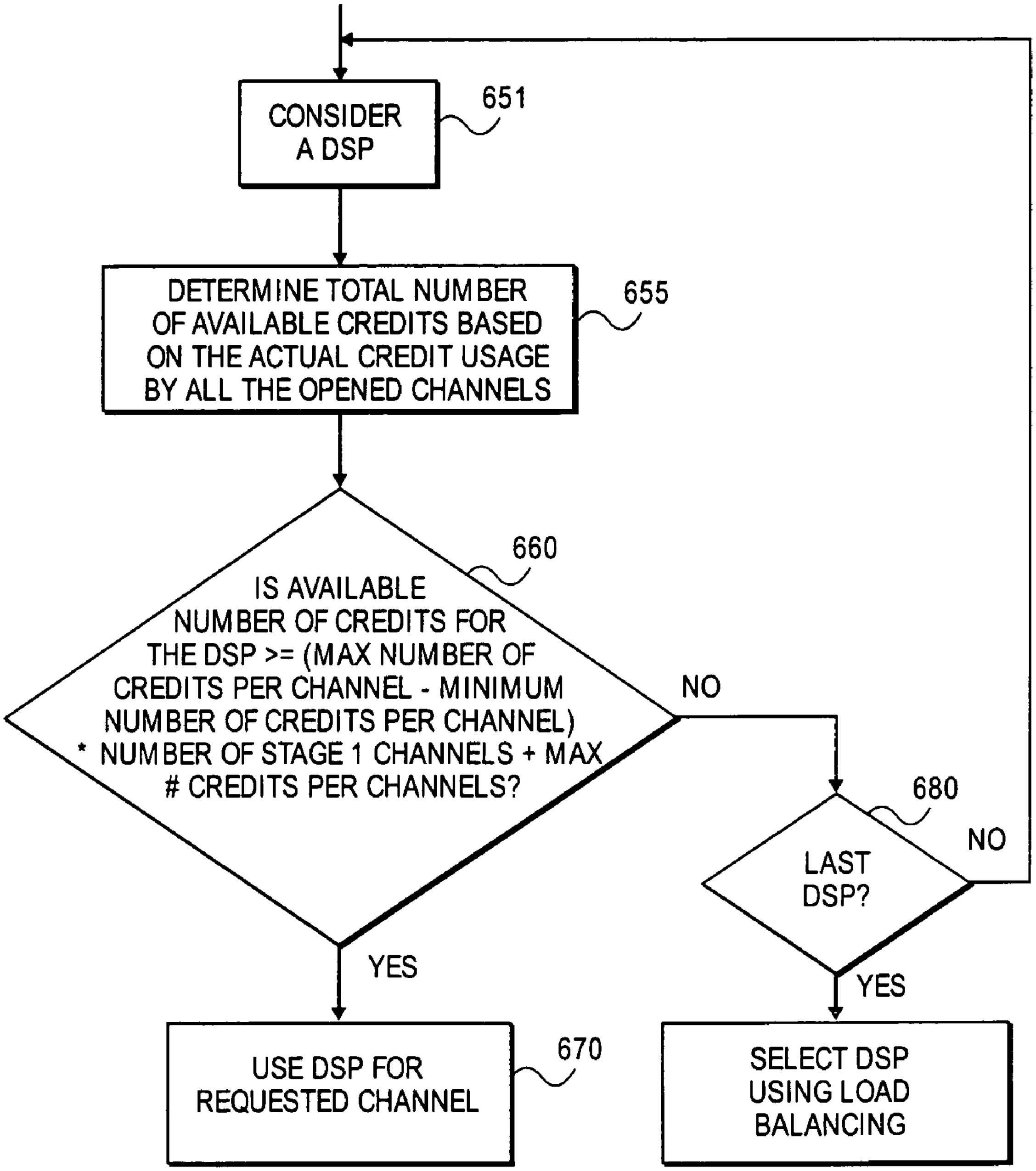

FIGS. 6A and 6B illustrate embodiments of a predictive non-load balancing method of digital signal processing resource allocation. Before a new channel is opened on a currently considered DSP, a potential credit growth is calculated against the credit limit for that DSP. Another DSP is searched for if any one of the following criteria cannot be satisfied for the currently considered DSP:

Criteria (a): the current DSP will not run short of credits if all the opened channels use the highest complexity codec (e.g., modem-relay).

Criteria (b): the current DSP does not have a potential for running out of credits when all the preallocated channels handle the highest complexity codec.

FIG. 6A illustrates one embodiment of a search for a DSP based on criteria (a). When a request for a channel is received by processing device 430, step 605, a DSP is considered for searching based on criteria (a) in step 610. Assume there are n channels open on the considered DSP. In step 620, the total number of available credits is determined for the currently considered DSP with the assumption that all the opened channels use the highest complexity codec. Then, in step 630, it is determined whether the total number of available credits for the currently considered DSP is greater than or equal to a potential maximum number of credits for the requested channel. If so, the currently considered DSP is used for the requested channel, step 640. If not, then it is determined whether the currently considered DSP is the last DSP searched, step 650. If the currently considered DSP is not the last DSP searched, then the process goes back to step 610 and is repeated with another DSP. If the considered DSP is the last DSP searched then the method proceeds to perform a search of the DSPs using either criteria (b) as discussed below in relation to FIG. 6B or a DSP is selected according to the load balancing method discussed below in relation to FIG. 7.

FIG. 6B illustrates one embodiment of a search for a DSP based on criteria (b). In step 651, a DSP is selected for searching based on criteria (b). Assume there are n number of voice channels open on the considered DSP, among which m number of the channels are in stage 1 (i.e., the codec type is unknown) and n-m number of the channels are in stage 2 (i.e., the codec type is known). In step 655, determine the total number of available credits based on the actual credit usage by all the opened channels. In step 660, it is determined whether the available number of credits for the considered DSP is >=(the maximum number of credits per channel minus the minimum number of credits per channel)*the number of stage 1 channels+the maximum number of credits per channel. If so, the currently considered DSP is used for the requested channel, step 670.

If not, then it is determined whether the currently considered DSP is the last DSP searched, step 680. If the currently considered DSP is not the last DSP search, then the process goes back to step 650 and is repeated with another DSP. If the considered DSP is the last DSP searched then a DSP is selected according to the load balancing method discussed below in relation to FIG. 7.

One algorithm for implementing the method of FIGS. 6A and 6B in a VoIP application is as follows:

```
/* Search for a DSP based on Criteria (a). */
i. FOR (d=0; d<num_of dsp_in_the_group; d++) DO
{
   Assume that n voice channels are opened on DSP d.
   IF     total_credit[d]>=(n+1)*MAX_CREDIT_PER_
      CHANNEL
   THEN {return d, success}
   ELSE {continue on the next DSP}
}
/* Search for a DSP based on Criteria (b). */
ii. FOR (d=0; d<num_of dsp_in_the_group; d++) DO
{
   Assume that n voice channels are opened on DSP d,
      among which m channels do not have codec type
      determined (not reaching Step 2 yet)
```

IF available-credit[d]>=m*(MAX_CREDIT_PER_CHANNEL−MIN_CREDIT_PER_CHANNEL)+MAX_CREDIT_PER_CHANNEL
THEN {return d, success}
ELSE {continue on the next DSP}
}

When none of the DSPs in an array can avoid a potential overload (e.g., even with criteria b), a load balancing method may be used as discussed below in relation to FIG. 7.

Figure 7:
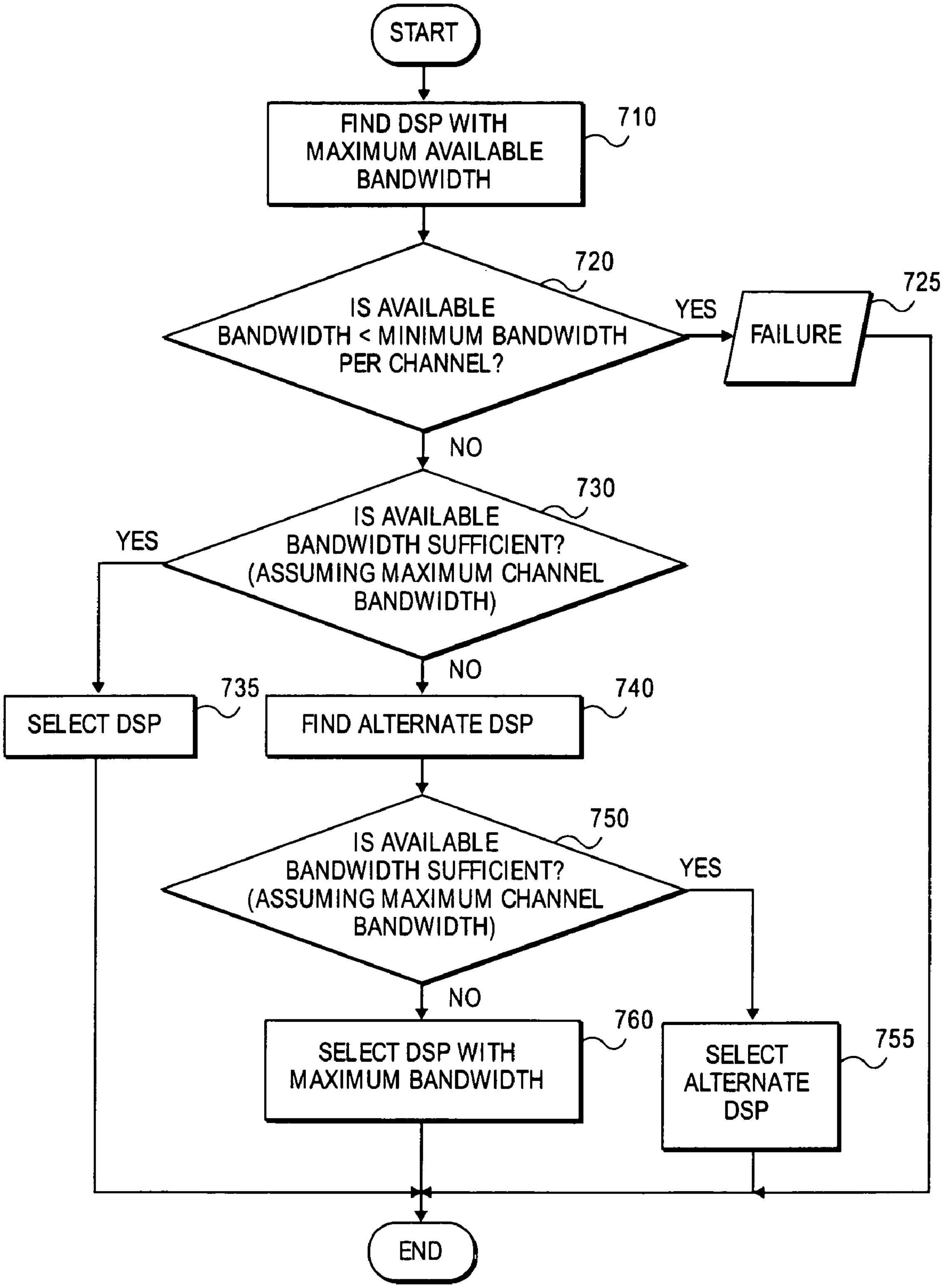
FIG. 7 illustrates one embodiment of a load balancing method of digital signal processing resource allocation.

FIG. 7 illustrates one embodiment of a load balancing method of digital signal processing resource allocation. The method of selecting a DSP begins by finding a first DSP with the maximum available bandwidth, step 710. If the maximum available bandwidth is determined to be less than a minimum required channel bandwidth, step 720, the attempt fails, step 725, and the system must wait until more bandwidth becomes available. Otherwise, the method then determines whether the amount of available bandwidth on the first DSP is sufficient to support the new call channel, assuming that the new channel and any previously open but still unestablished channels will each require the maximum possible per channel bandwidth, step 730. If the first DSP has sufficient bandwidth available, the channel (e.g., call) is established on that DSP, step 735.

If the amount of available bandwidth on the first DSP is not sufficient to hold the channel, this method then searches for a second, alternate DSP in which to establish the channel, step 740. When the second DSP is identified, the method determines whether the amount of available bandwidth on the second, alternate DSP is sufficient to support the new call channel, assuming that the new channel and any previously open but still unestablished channels on that processor will each require the maximum possible per channel bandwidth, step 750. If sufficient bandwidth is available, the alternate DSP is selected to hold the channel, step 755.

If neither the first or second DSPs have sufficient bandwidth to accommodate the maximum possible channel bandwidth requirements, the method then selects the DSP with the maximum spare bandwidth, step 760. Spare bandwidth is the available bandwidth minus the maximum amount of additional bandwidth that may be required by any open but unestablished channels on a DSP.

A preferred algorithm for implementing the method of FIG. 7 in a VoIP application is as follows:

i. Find DSP (d) with the max amount of MIPS and min number of voice channels opened;
IF available_mips[d]<MIN_MIPS_PER_CHANNEL
THEN {return (−1), failure}
ELSE {go to ii.} ii. Assume that n voice-channels are opened on DSP d, among which m channels do not have codec type determined (i.e., have not yet reached stage 2);
IF available_mips[d]>=m*(ΔMIPS)+MAX_MIPS_PER_CHANNEL
where ΔMIPS=MAX_MIPS_PER_CHANNEL−MIN_MIPS_PER_CHANNEL
THEN {return d, success}
ELSE {go to iii.} iii. Try to find a DSP d1 (d1 !=d) with the maximum available MIPS and with available_mips[d1]>=m1*(ΔMIPS)+MAX_MIPS_PER_CHANNEL
where ΔMIPS=MAX_MIPS_PER_CHANNEL−MIN_MIPS_PER_CHANNEL, and
where m1 is the number of channels on DSP d1 without codec determined;
IF d1 found,
THEN {return d1, success}
ELSE {go to iv};

iv. Try to find a DSP d2 (d2 !=d, could be d1) with the max available spare MIPS, calculated as: spare_mips_d2=available_mips[d2]−m2*(ΔMIPS)
where ΔMIPS=MAX_MIPS_PER_CHANNEL−MIN_MIPS_PER_CHANNEL, and
where m2 is the number of channels on DSP d2 without codec determined;
IF (spare_mips_d2>spare_mips_d)
AND (spare_mips_d2>MIN_MIPS_PER_CHANNEL)
THEN {return d2, success}
ELSE {return d, success}

The third (iii) and fourth (iv) steps of this algorithm could be implemented in one function using a single pass over the DSPs. The fourth step (iv) addresses the situation where one DSP has many channels starting on it (only stage 1 completed) while other DSPs have many channels in a steady state (stage 2 completed).

Figure 8:
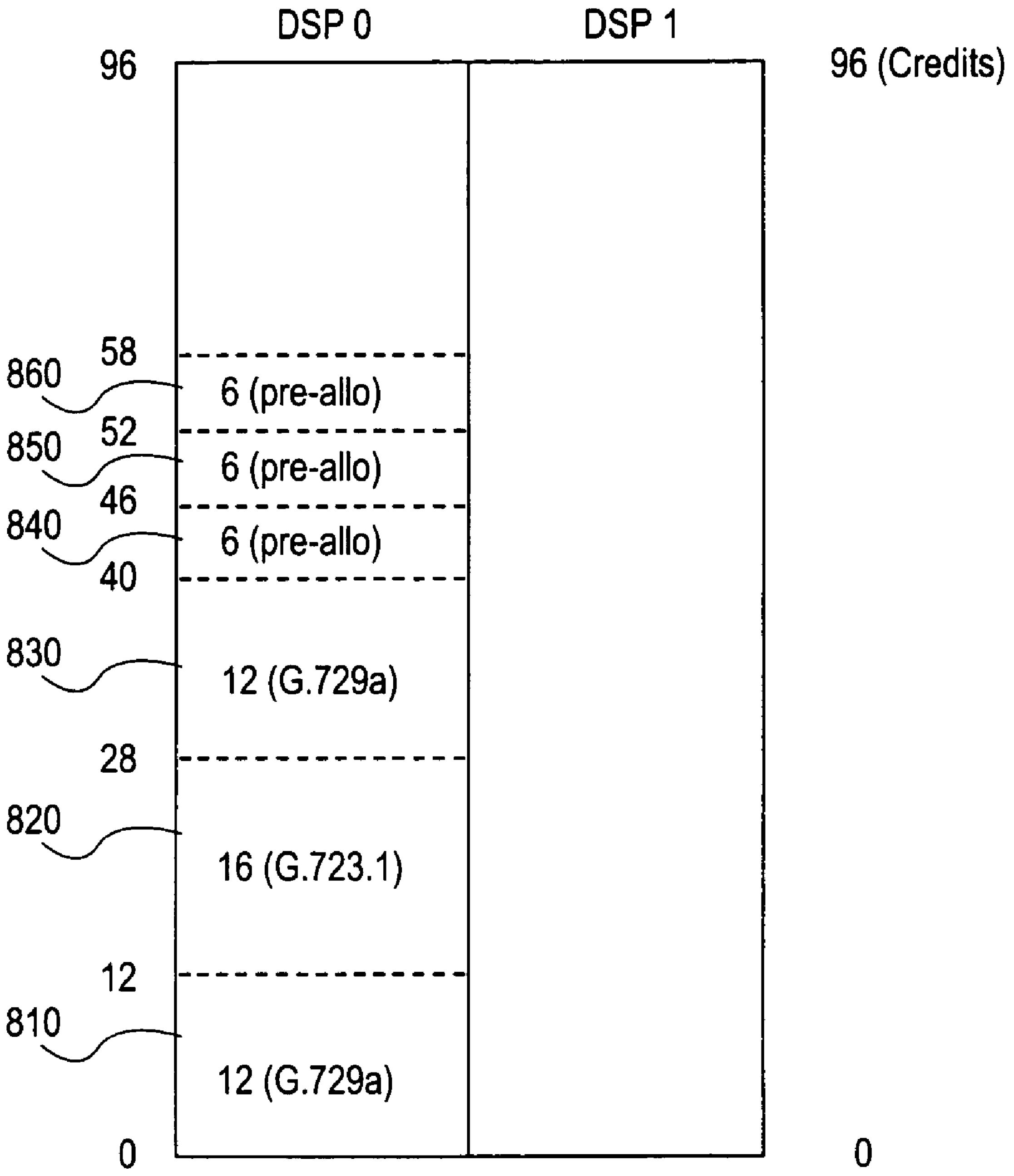
FIG. 8 is an exemplary diagram of two DSPs illustrating allocation of channels according to the predictive non-load balancing methods of FIGS. 6A and 6B.

FIG. 8 is an exemplary diagram of two DSPs illustrating allocation of channels according to the predictive non-load balancing methods of FIGS. 6A and 6B. In the following example, assume the DSP array 460 contains two DSPs, namely DSP 0 and DSP 1. Also assume some voice calls are already set up with codec type G.723.1 or G.729a (i.e., stage 2 is completed) as shown by fields 810-830 in FIG. 8. The other voice channels have only completed stage 1 and DSP credits are preallocated for them as shown by fields 840-860.

Mapping to the algorithm, the following values are set for FIG. 8: the maximum number of credits per DSP=96; the available credit for DSP 0 (96 max−58 open)=38, with n=6 (channels open) and m=3 (channels in stage 1); and the available credits for DSP 1=96 with n=0 and m=0 (i.e., no channels used); the potential maximum number of credits to be used for a channel (MAX_CREDIT_PER_CHANNEL) is 16.

The method starts searching from DSP 0 when a new setup request comes. For DSP 0 in FIG. 8, using the method steps for criterion (a), the total required credits would be (6+1)*16=102>total_credit 96, so the next DSP should be used to open the channel.

As an example to reach the method steps for criteria (b), assume that DSP 1 already hosts n=6 channels. For DSP 0, the available credits are 38=96-58, less than the potential required credits 46=3*(16-6)+16. As a result, the new channel will be opened on DSP 1, even if the current available credits on DSP 0 can still hold two high complexity channels.

After DSP 1 is also filled up and cannot satisfy criteria (b) (i.e., the available credits<potential credits), call setup requests will be handled by the load-balancing method discussed above with respect to FIG. 7. The best DSP is searched for. As long as there is a DSP with available credits of 6 (MIN_CREDIT_PER_CHANNEL) or more, the call setup request will be accepted.

The scheme described above in relation to FIGS. 6A, 6B and 7 provides the flexibility of doing load balancing, maximizing the use of a single DSP, or a mixed allocation of both. Load balancing may render a higher call success rate on the NAS with multiple DSPs and lower the impact and risk of a single DSP's crash. While maximizing a single DSP leaves free DSPs for particular applications that require an entire DSP's resources. The principles discussed herein may be used in any resource management application and are not limited to the management of credits in DSPs. In alternative embodiments, the methods discussed herein may be used, for example, in management of video processing resources.

Although the methods and apparatus of embodiments of the invention have been described at times in relation to hardware or software components, the methods and apparatus may also be implemented by either or a combination of hardware and software. Portions of the present invention may be provided as in the form of a machine-readable medium having stored thereon instructions, which may be used to program a computer system (or other electronic devices) to perform a process according to the present invention. A machine readable medium includes any mechanism for storing information in a form (e.g., software, processing application) readable by a machine (e.g., a computer). The machine-readable medium may includes, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other medium suitable for storing electronic instructions. Various programming languages may be used to implement the algorithms discussed above with respect to FIGS. 6A, 6B and 7, for example, C, C++, Java, Perl, Visual Basic, or other languages known in the art.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. In addition, while the invention has been described in terms of several embodiments, those skilled in the art will recognize that the invention is not limited to the embodiments described. The embodiments of the invention can be practiced with modification and alteration within the scope of the appended claims. The specification and the drawings are thus to be regarded as illustrative instead of limiting on the invention.

What is claimed is:

1. A method, comprising:

predicting a number of credits of a signal processor for a channel at a channel setup stage when a codec is unknown to determine the codec, wherein the predicting comprises preallocating a total number of credits for each of a plurality of signal processors; and calculating a potential credit growth against the total number of credits available for a currently considered signal processor; and selecting, by a processing device, a signal processor having the codec from among the plurality of signal processors to open the channel based on the predicting.

2. The method of claim 1, wherein predicting further comprises:

determining whether the currently considered signal processor will not run short of credits if all opened channels use a highest complexity codec.

3. The method of claim 2, wherein predicting further comprises performing at least one of:

determining whether the currently considered signal processor does not have a potential for running out of credits when all the preallocated total number of credits for the plurality of signal processors can handle the highest complexity codec; and determining a load balance for the plurality of signal processors.

4. The method of claim 2, wherein determining whether the currently considered signal processor will not run short of credits if all opened channels use a highest complexity codec comprises:

determining whether the total number of credits for the currently considered signal processor is greater than or equal to a maximum number of credits for a requested channel and, if so, selecting the currently considered signal processor for the requested channel.

5. The method of claim 3, wherein determining whether the currently considered signal processor does not have a potential for running out of credits when all the preallocated total number of credits for the plurality of signal processors can handle the highest complexity codec comprises:

assuming n number of channels open on the currently considered signal processor, among which m number of channels are have an unknown codec and n-m number of channels have a known codec;

determining a total number of available credits based on an actual credit usage by all open channels;

determining whether an available number of credits for the currently considered signal processor is greater than or equal to a maximum number of credits per channel minus a minimum number of credits per channel, multiplied by the m number of channels having the unknown codec plus the maximum number of credits per channel; and if so, selecting the currently considered signal processor for the requested channel.

6. The method of claim 3, wherein determining a load balance for the plurality of signal processors comprises:

selecting a signal processor of the plurality of signal processors that has sufficient bandwidth to open the requested channel assuming that a new channel to be opened and any open but unestablished channels on the signal processor require more than a minimum amount of bandwidth per channel.

7. The method of claim 6, wherein determining a load balance for the plurality of signal processors further comprises:

determining whether an amount of available bandwidth in a first signal processor having a maximum amount of available bandwidth is sufficient to meet the bandwidth requirements of the new channel assuming that the new channel and any open but unestablished channels on the first signal processor will require a maximum amount of bandwidth per channel when established; and selecting the first signal processor if the amount of available bandwidth is sufficient.

8. The method of claim 7, wherein selecting the signal processor further comprises:

if the amount of available bandwidth of the first signal processor is not sufficient, then determining whether an amount of available bandwidth in a second signal processor is sufficient to meet the bandwidth requirements of the new channel assuming that the new channel and any open but unestablished channels on the second signal processor will require a maximum amount of bandwidth per channel when established; and selecting the second signal processor if the amount of available bandwidth in the second signal processor is sufficient.

9. The method of claim 8, wherein selecting the signal processor further comprises:

if the amount of available bandwidth in the second signal processor is not sufficient, then determining an amount of spare bandwidth in the plurality of signal processors; and selecting the signal processor with the greatest amount of spare bandwidth.

10. The method of claim 1, wherein each of the plurality of signal processors is a digital signal processor.

11. An apparatus, comprising:

a plurality of signal processors, each having at least one codec; and a processing device coupled to the plurality of signal processors, the processing device configured to predict a number of credits of the signal processors for a channel at a channel setup stage when a codec is unknown to determine the codec and selecting a signal processor of the plurality of signal processors having the codec to open the channel based on the prediction, and a credit table including a maximum number of channels per signal processor and credits required per channel for each of the at least one codec.

12. The apparatus of claim 11, further comprising signal processor firmware comprising credit table information.

13. The apparatus of claim 11, further comprising an Internetwork Operating System (IOS) code wherein the IOS code comprises the credit table.

14. The apparatus of claim 13, wherein the processing device is further configured to preallocate a total number of credits for each of the plurality of signal processors and calculate a potential credit growth against the total number of credits available for a currently considered signal processor.

15. The apparatus of claim 14, wherein the processing device is further configured to determine whether the currently considered signal processor will not run short of credits if all opened channels use a highest complexity codec.

16. The apparatus of claim 14, wherein the processing device is further configured to perform at least one of:

determining whether the currently considered signal processor does not have a potential for running out of credits when all the preallocated total number of credits for the plurality of signal processors can handle the highest complexity codec; and determining a load balance for the plurality of signal processors.

17. The apparatus of claim 11, wherein each of the plurality of signal processors is a digital signal processor.

18. An apparatus, comprising:

means for predicting a number of credits of a signal processor that for a channel at a channel setup stage when a codec is unknown to determine the codec;

means for selecting a signal processor having the codec from among a plurality of signal processors to open the channel based on the predicting; and means for preallocating a total number of credits for each of the plurality of signal processors and calculating a potential credit growth against the total number of credits available for a currently considered signal processor.

19. The apparatus of claim 18, wherein the means for predicting further comprises means for determining whether the currently considered signal processor will not run short of credits if all opened channels use a highest complexity codec.

20. The apparatus of claim 19, wherein the means for predicting further comprises means for performing at least one of determining whether the currently considered signal processor does not have a potential for running out of credits when all the preallocated total number of credits for the plurality of signal processors can handle the highest complexity codec, and determining a load balance for the plurality of signal processors.

21. The apparatus of claim 18, wherein each of the plurality of signal processors is a digital signal processor.

22. A machine accessible storage medium that stores instructions which, when executed by a processing device, cause the processing device to perform operations comprising:

predicting a number of credits of a signal processor for a channel at a channel setup stage when a codec is unknown to determine the codec wherein the predicting comprises preallocating a total number of credits for each of a plurality of signal processors; and calculating a potential credit growth against the total number of credits available for a currently considered signal processor; and selecting a signal processor having the codec from among the plurality of signal processors to open the channel based on the predicting.

23. The machine accessible storage medium of claim 22, wherein predicting further comprises determining whether the currently considered signal processor will not run short of credits if all opened channels use a highest complexity codec.

24. The machine accessible storage medium of claim 23, wherein predicting further comprises performing at least one of:

determining whether the currently considered signal processor does not have a potential for running out of credits when all the preallocated total number of credits for the plurality of signal processors can handle the highest complexity codec; and determining a load balance for the plurality of signal processors.

* * * * *

UNITED STATES PATENT AND TRADEMARK OFFICE

CERTIFICATE OF CORRECTION

PATENT NO. : 7,583,658 B1
APPLICATION NO. : 10/871581
DATED : September 1, 2009
INVENTOR(S) : Wang et al.

It is certified that error appears in the above-identified patent and that said Letters Patent is hereby corrected as shown below:

In column 6, line 53, delete "of dsp" and insert -- of_dsp --, therefor.

In column 6, line 63, delete "of dsp" and insert -- of_dsp --, therefor.

In column 7, line 1, delete "available-credit" and insert -- available_credit --, therefor.

Signed and Sealed this

Ninth Day of March, 2010

David J. Kappos
*Director of the United States Patent and Trademark Office*

UNITED STATES PATENT AND TRADEMARK OFFICE

CERTIFICATE OF CORRECTION

PATENT NO. : 7,583,658 B1
APPLICATION NO. : 10/871581
DATED : September 1, 2009
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1273 days.

Signed and Sealed this

Fourteenth Day of September, 2010

David J. Kappos

*Director of the United States Patent and Trademark Office*